(12) United States Patent
Potter et al.

(10) Patent No.: US 7,175,690 B2
(45) Date of Patent: Feb. 13, 2007

(54) PRE-TREATMENT PROCESS FOR FEED MATERIAL FOR DIRECT REDUCTION PROCESS

(75) Inventors: Stephen M. Potter, Rio de Janeiro (BR); John Y. Clark, Brasilia D.F. (BR)

(73) Assignee: Rio Tinto Brasil (BR)

( * ) Notice: Subject to any disclaimer, the term of this patent is extended or adjusted under 35 U.S.C. 154(b) by 0 days.

(21) Appl. No.: 10/789,696

(22) Filed: Feb. 27, 2004

(65) Prior Publication Data

US 2004/0261575 A1 Dec. 30, 2004

Related U.S. Application Data

(60) Provisional application No. 60/450,855, filed on Feb. 28, 2003.

(51) Int. Cl.
*C21B 13/02* (2006.01)
(52) U.S. Cl. .......................... 75/488; 266/199
(58) Field of Classification Search .................. 75/414, 75/490, 488, 489, 496, 798, 440, 484, 443, 75/503; 266/156, 175, 142, 160, 182, 199; 55/6
See application file for complete search history.

(56) References Cited

U.S. PATENT DOCUMENTS

| | | | | |
|---|---|---|---|---|
| 3,764,123 | A * | 10/1973 | Beggs et al. ................. | 266/140 |
| 3,928,021 | A * | 12/1975 | Matsubara et al. ........... | 75/448 |
| 4,049,435 | A * | 9/1977 | Lotosh et al. ................. | 75/768 |
| 5,445,363 | A * | 8/1995 | Becerra-Novoa et al. ... | 266/182 |
| 6,336,954 | B1 * | 1/2002 | Zeller et al. .................. | 75/380 |
| 6,395,056 | B1 * | 5/2002 | Villarreal-Trevino et al. . | 75/496 |

OTHER PUBLICATIONS

Int. J. Miner. Process. 59 (2000) 195-213. "Modeling iron ore degradation using a twin pendulum breakage device", D.M. Weedon, F. Wilson.*

* cited by examiner

*Primary Examiner*—Roy King
*Assistant Examiner*—Kathleen McNelis
(74) *Attorney, Agent, or Firm*—Clements Walker; Richard A. Walker

(57) ABSTRACT

A pretreatment process for solid lump feed material for a gas and pellet/lump-based direct reduction process, comprising preheating feed material to a temperature of from about 200 C to about 500 C, without reduction, in a non-reducing atmosphere prior to charging the feed material to gas-based direct reduction furnace, thereby minimizing the formation of fines within the furnace.

6 Claims, 3 Drawing Sheets

PRE-TREATMENT PROCESS FOR FEED MATERIAL FOR DIRECT REDUCTION PROCESS

CROSS REFERENCE TO RELATED APPLICATION

This application claims the benefit of U.S. Provisional Application No. 60/450,855, filed Feb. 28, 2003.

FIELD OF THE INVENTION

The present invention relates to a method and apparatus for pre-treatment of solid lump feed material for gas and pellet/lump-based moving bed direct reduction processes, and more particularly to method and apparatus for raising the effective reducing temperature throughout the moving bed.

BACKGROUND OF THE INVENTION

In a shaft furnace reduction process, iron ore or iron oxide in lump or pelletized form is fed into the upper portion of the furnace to form a burden of such lumps and/or pellets. Reducing gas is introduced into the mid-portion of the shaft furnace, usually about the periphery, through a bustle and tuyere arrangement. The reducing gas introduction temperature is generally about 850 C, which will not cause the burden to melt. The reducing gas moves upward through the burden, heating the burden and reacting with the iron oxide in it to form metallized iron. The reacted gas is removed from the top of the furnace, and the reduced iron pellets and/or lumps continue their downward movement, are usually cooled in the lower portion of the furnace, and are discharged for further use.

DESCRIPTION OF THE PRIOR ART

Applicants are aware of the following US Patents concerning moving bed direct reduction processes:

| U.S. Pat. No. | Issue Date | Inventor | Title |
| --- | --- | --- | --- |
| 6,475,264 B1 | Nov. 05, 2002 | Dry | DIRECT SMELTING PROCESS |
| 6,395,056 | May 28, 2002 | Villareal-Trevino et al | METHOD FOR THE HEAT TREATMENT OF IRON ORE LUMPS IN A REDUCTION SYSTEM |
| 6,379,421 B1 | Apr. 30, 2002 | Salinas-Fernandez | METHOD AND APPARATUS REMOVING UNDESIRABLE METALS FROM IRON-CONTAINING MATERIALS |
| 6,277,324 B1 | Aug. 21, 2001 | Joo, et al. | APPARATUS FOR MANUFACTURING MOLTEN PIG IRON AND REDUCED IRON BY UTILIZING A FLUIDIZED BED |
| 6,224,649 B1 | May 01, 2001 | Villarreal-Trevino | METHOD AND APPARATUS FOR REDUCING IRON-OXIDES-PARTICLES HAVING A BROAD RANGE OF SIZES |
| 6,132,489 | Oct. 17, 2000 | Villareal-Trevino | METHOD AND APPARATUS FOR REDUCING IRON-OXIDES-PARTICLES HAVING A BROAD RANGE OF SIZES |
| 5,785,733 | Jul. 28, 1998 | Lee, et al. | FLUIDIZED BED TYPE REDUCTION APPARATUS FOR IRON ORE PARTICLES AND METHOD FOR REDUCING IRON ORE PARTICLES USING THE APPARATUS |
| 5,961,690 | Oct. 05, 1999 | Kepplinger, et al. | PROCESS FOR PRODUCING MOLTEN PIG IRON OF LIQUID STEEL PREPRODUCTS AND PLANT FOR CARRYING OUT THE PROCESS |
| 5,531,424 | Jul. 02, 1996 | Whipp | FLUIDIZED BED DIRECT REDUCTION PLANT |
| 4,978,387 | Dec. 18, 1990 | Kepplinger | PROCESS FOR THE PRODUCTION OF MOLTEN PIG IRON |
| 3,591,363 | Jul. 06, 1971 | D. L. Campbell | RADIANT HEATED IRON ORE REDUCTION PROCESS |
| 3,295,956 | Jan. 03, 1967 | T. H. Whaley | ORE REDUCTION |
| 2,877,107 | Mar. 10, 1959 | J. F. Magness | FINES HANDLING PROCESS |

Villarreal-Trevino U.S. Pat. No. 6,224,649 teaches a method for handling a feed material with a high percentage of fines by utilizing spent reducing gas from the direct reduction furnace as a preheating gas just ahead of the step of charging the feed material into the furnace. The temperature utilized is from 650 C to 1050 C. This patent does not attempt to reduce the fines produced in the process, but to reduce the fines to metallized product. The fines handling problem remains.

SUMMARY OF THE INVENTION

The invented process is a pre-treatment for gas-based moving bed shaft furnace direct reduction processes, and is particularly useful with HyL (Hylsa, S.A.) and Midrex Processes. Existing commercial iron ore reduction plants producing Direct Reduced Iron (DRI) rely on the feeding of pellets to maintain productivity of the furnace and homogeneity of the final DRI product. The most commonly used processes are very sensitive to finely divided (less than 6 mm) particulate material, denoted "fines" which are generated from the lumps or pellets that are fed to the reducing furnace during operation. Such generated fines will partially fill the interstices between the pellets and/or lumps, restricting the flow of hot reducing gas, and causing "channeling" of the gas. This results in localized hot spots within the furnace, which can cause the formation of fused pellets or lumps, called clusters, which in turn can cause furnace blockage. This can also result in the metallization of the product not being homogenous.

Lump ores generally have a greater tendency to product fines than do pellets. In order to limit the amount of fines generated within the furnace, the proportion of lump ores fed to the furnace must be limited.

Lump ore is just crushed and screened ore, and the lumps are not industrially produced as are pellets. Thus the cost of lump is less than the same weight of pellets. Any restriction on the amount of lump that can be used as a starting material becomes a financial penalty for the operation. Since the iron ore feed material is typically half or more of the cost of production of DRI, such a financial penalty can be significant.

The present invention pre-treats the feed material introduced to the direct reduction furnace which significantly reduces generation of fines. The invented process can be modified to be effective with a particular plant design.

It is understood within the direct reduction industry that reduction in the temperature of 500–750 C within the furnace zone above the reduction zone results in low temperature decrepitation. The inventors have determined that the less reduction of ore that occurs at a temperature less than 750 C, the less fines are generated due to low temperature decrepitation. The cause of low temperature decrepitation is believed to be due to crystalline phase changes that occur when iron ore is converted from hematite ($Fe_2O_3$) to magnetite ($Fe_3O_4$) to wustite (FeO) to iron (Fe). While undertaking research activities to maximize the utility of Corumba lump iron ore, it was discovered that the proportion of fines produced from Corumba lump at temperatures from 500–750 C is very high, on the order of 40%, which limits Corumba's use in direct reduction processes such as the Midrex Process or the HyL Process.

It was then determined that by preheating Corumba lump ore in a non-reducing atmosphere to a temperature of about 850, without cooling prior to subjecting the heated lump to reducing gases, the fines generation is only about 10%. The invented process is expected to produce similar reductions in fines generation with other sources of lump iron ore, and with pellets, which, while somewhat less dramatic, will nonetheless increase the productivity of the direct reduction furnace. Metallized DRI fines have a substantially lower value than the metallized DRI lump, and handling and disposal of unnecessary fines is costly.

Productivity of the DRI furnace is also increased by charging lump ore to the top of the shaft furnace at a higher temperature than ambient. A typical furnace burden has a temperature profile beginning at the top of the furnace to the middle of the furnace from about 400 C to about 850 C. If the temperature of the burden at the top of the furnace is increased to about 800 C, or to at least about 750 C, the iron ore burden remains at a higher average temperature during the reduction phase. This condition enables the furnace to operate at higher productivity. The increase in productivity spreads the fixed costs of the plant, including capital costs, over greater volumes of product, improving the overall economics of the direct reduction process and the plant.

Certain processes operate with a temperature profile across the burden where the center is considerably cooler than the outer edges, because of endothermic reactions within the furnace. Charging of preheated lump increases the temperature across the burden profile, particularly where it is inherently low.

OBJECT OF THE INVENTION

It is an object of this invention to provide means for increasing the temperature of any portion of the burden in a gas-fired, lump-fed direct reduction furnace more quickly than is possible with current processes.

DETAILED DESCRIPTION

Figure 1:
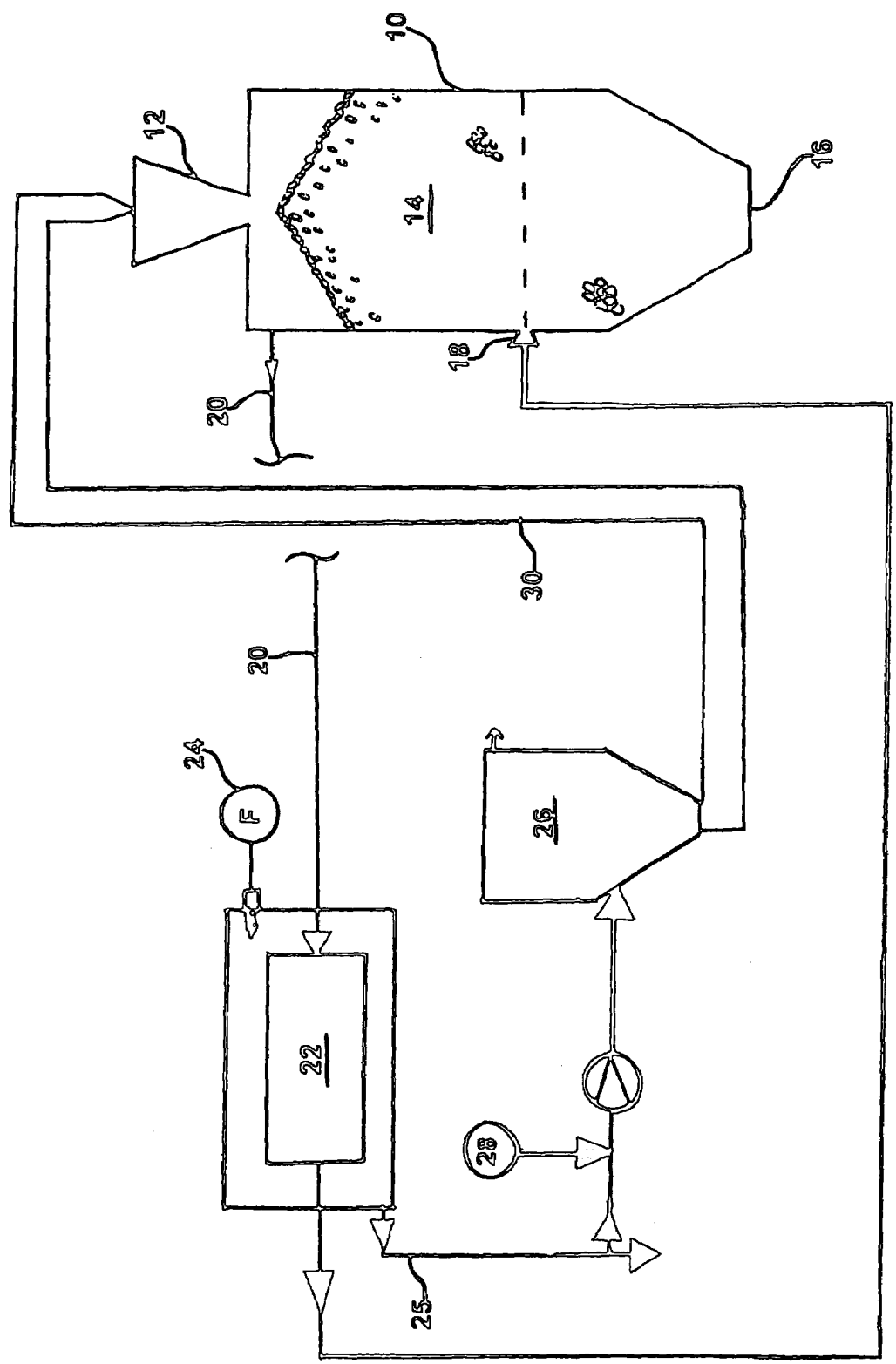
FIG. 1 is a schematic process diagram showing the process and the apparatus for carrying out the invented process.

As shown in FIG. 1, a direct reduction furnace 10 has an upper charging end with means 12 for charging lump ore and/or oxide pellets into the furnace to form a burden 14. The lower end 16 of the furnace has a discharge means for discharging the reduced metallized product from the furnace, and causing the burden to move downwardly as the metallized product is removed. At the middle of furnace is a reducing gas injection system 18 made up of a bustle and tuyeres. Hot reducing gas is injected into the furnace through the bustle and tuyeres.

Reacted reducing gas, or spent off-gas, principally carbon dioxide and steam, is removed from top of the furnace at 20, cleaned, and passed through a reformer 22 to change it to reducing gas, principally hydrogen and carbon monoxide, for reintroduction to the furnace through the bustle and tuyeres. The fuel gas 24 utilized for heating the reformer is combusted and results in a hot waste off-gas 25 from which heat is usually recovered. Combustion causes the waste gas to be oxidized, so that it is principally a mixture of nitrogen and carbon dioxide, which are inert, or at least non-reducing.

Lump ore feed material is stored in a bin 26 before it is charged into the shaft furnace for reduction. In accordance with the present invention, hot waste off-gas 25 is removed from the reformer heating chamber, may be passed through a heat recovery system, such as a boiler, is compressed, and passed through the storage bin 26 to heat the ore therein to about 200 to 500 C, preferably to the range of 400 to 450 C. The off-gas is introduced to the bin at a controlled temperature, and under non-reducing conditions. The temperature of the off-gas can be tempered by introduction of cooling air 28, as necessary. After heating of the iron ore charge material, it is transported through an insulated charging system 30 to the furnace under either an inert or oxidizing atmosphere, and is then introduced to the upper portion of the furnace to form the burden. A dynamic seal arrangement may be utilized to provide thermal insulation.

Moisture in the lump ore is a problem which must be and is overcome by preheating and predrying the iron ore, which reduces the water content of the pellet or lump from about 4% to less than 0.5%.

The preheated iron ore increases in temperature from its introduction temperature of about 400 C to more than 750 C in less than 20 minutes, while descending just the first half meter of the furnace height. The reducing gases in this portion of the furnace are not very high in quality, thus only limited reduction of iron ore occurs in this upper region, which avoids production of fines.

By preheating the lump charge material to a range of 200 C to 500 C, the materials used in the construction of the bin 26 and the transporting mechanism 30 can be steel, rather than the much more expensive refractory materials required in higher temperature devices. The invented process requires very little additional operating cost as the waste gas from the reformer operation is already available.

Figure 2:
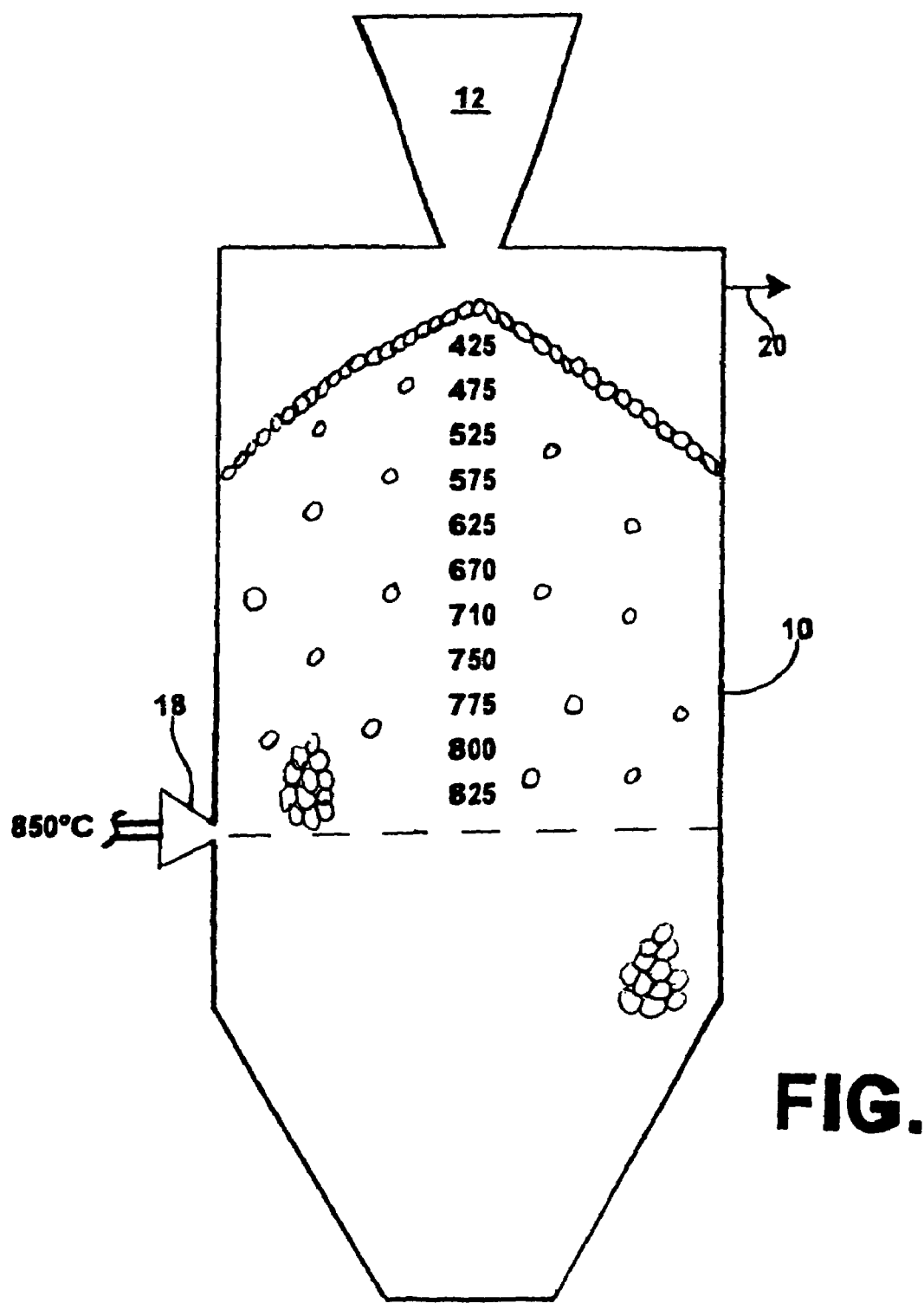
FIG. 2 is a schematic view of a direct reduction furnace showing a typical temperature profile of the prior art.
Figure 3:
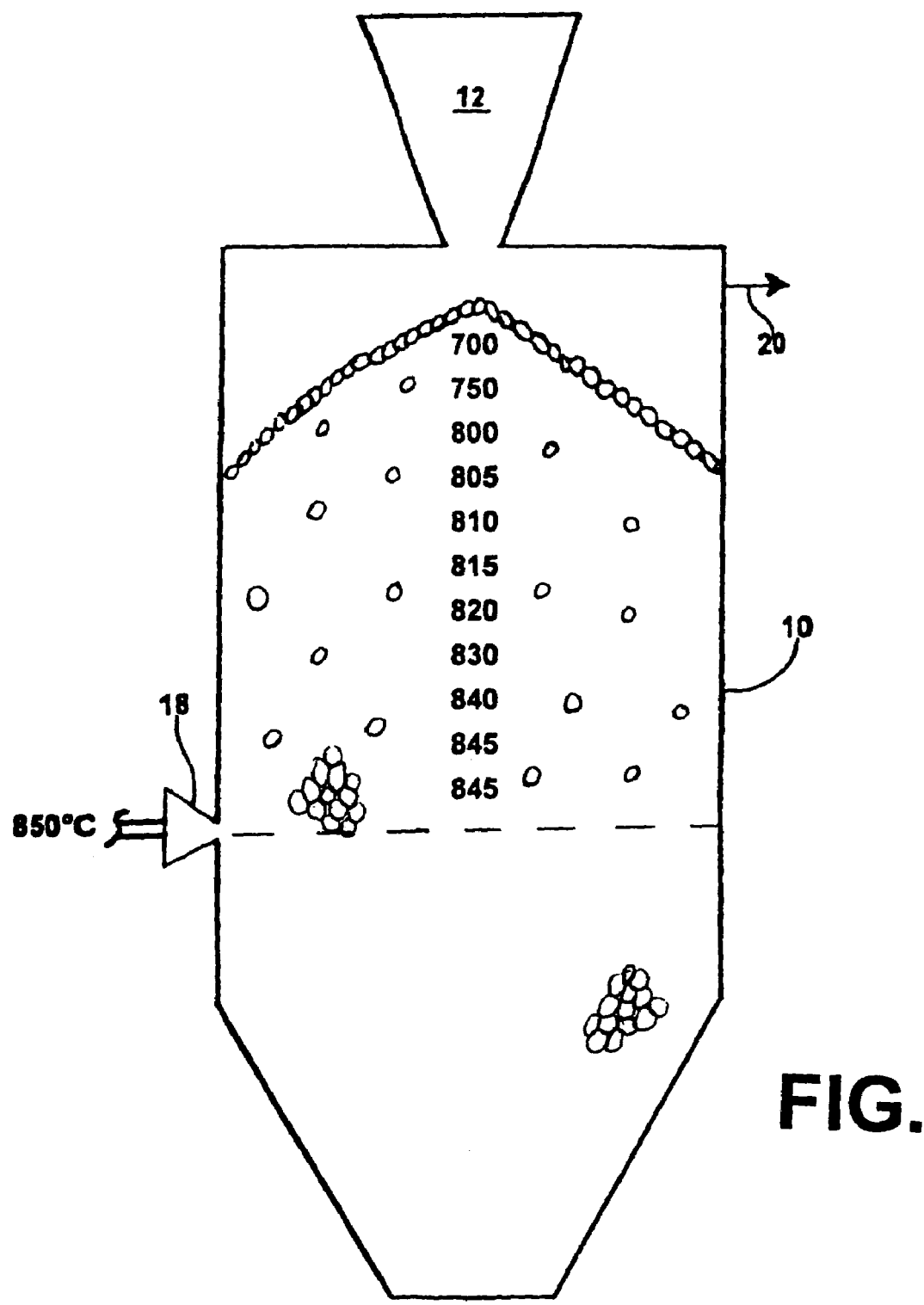
FIG. 3 is a schematic view of a direct reduction furnace showing a temperature profile when utilizing the invented process.

FIG. 3 shows the enhanced temperature profile in the direct reduction furnace when utilizing the invented process. This is to be compared to the prior art temperature profile shown in FIG. 2, which shows that the present invention reduces the zone of low-temperature reduction.

While the invention has been described in relation to direct reduction plants that utilize gas reformers, in the event that an installation does not have reformers, a different heating mechanism is required. Also, if a reformer produces waste gas with insufficient heat content to raise the temperature of the charge material to about 400 C, alternative heating mechanisms are used.

SUMMARY OF THE ACHIEVEMENTS OF THE INVENTION

From the foregoing, it is readily apparent that we have invented an improved method and apparatus for pretreatment of solid lump feed material for gas and pellet/lump-based direct reduction processes by preheating the feed material without reduction, in a non-reducing atmosphere prior to charging the feed material to a gas-based direct reduction furnace, thereby minimizing the formation of fines within the furnace.

It is to be understood that the foregoing description and specific embodiments are merely illustrative of the best mode of the invention and the principles thereof, and that various modifications and additions may be made to the method and apparatus by those skilled in the art, without departing from the spirit and scope of this invention.

What is claimed is:

1. A pre-treatment process for solid lump feed material for a gas and pellet/lump-based shaft furnace direct reduction process, comprising:
   preheating and predrying hematite lump feed material to a temperature of from about 200° C. to less than or equal to 500° C., without reduction, in a non-reducing atmosphere prior to charging the feed material to gas-based direct reduction furnace;
   transporting the lump feed material through an insulated charging system having either an inert or oxidizing atmosphere;
   charging the feed material from the insulated charging system to the furnace; and
   increasing the temperature of the pre-heated feed material within the furnace from the material introduction temperature to about 750° C. within the first 20 minutes of charging the feed material into the furnace;
   whereby the formation of fines within the furnace is minimized.

2. A process according to claim 1, wherein the feed material is pre-heated to a temperature of about 200° C. to 425° C.

3. A process according to claim 1, wherein said preheating is accomplished in a feed storage bin by introduction of waste off-gases at a sufficient temperature to heat the feed material in the storage bin.

4. A process according to claim 3 wherein the waste off-gas temperature is in excess of 500° C. upon introduction into the feed storage bin.

5. A process according to claim 3, wherein said waste off-gases are removed from a reformer associated with the direct reduction process.

6. A pre-treatment process for solid lump feed material for a gas and pellet/lump-based shaft furnace direct reduction process, comprising:
   preheating and predrying hematite lump feed material to a temperature of from about 200° C. to less than or equal to 500° C., without reduction, in a non-reducing atmosphere prior to charging the feed material to gas-based direct reduction furnace;
   transporting the lump feed material through an insulated charging system having either an inert or oxidizing atmosphere;
   charging the feed material from the insulated charging system to the furnace; and
   increasing the temperature of the preheated feed material within the furnace from the material introduction temperature of less than or equal to 500° C. to about 750° C. in less than 20 minutes while the feed material descends the first half meter in the furnace after introduction of the feed material into the moving bed of the furnace;
   whereby the formation of fines within the furnace is minimized.

* * * * *